(12) United States Patent
Chu et al.

(10) Patent No.: US 10,288,938 B2
(45) Date of Patent: May 14, 2019

(54) BACKLIGHT ADJUSTMENT METHOD AND SYSTEM, BACKLIGHT MODULE AND DISPLAY DEVICE

(71) Applicant: BOE Technology Group Co., Ltd., Beijing (CN)

(72) Inventors: Yifang Chu, Beijing (CN); Chulgyu Jung, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/563,362

(22) PCT Filed: Mar. 8, 2017

(86) PCT No.: PCT/CN2017/075956
§ 371 (c)(1),
(2) Date: Sep. 29, 2017

(87) PCT Pub. No.: WO2017/197961
PCT Pub. Date: Nov. 23, 2017

(65) Prior Publication Data
US 2018/0188605 A1    Jul. 5, 2018

(30) Foreign Application Priority Data
May 20, 2016   (CN) .......................... 2016 1 0342245

(51) Int. Cl.
*G02F 1/1335*  (2006.01)
*H05B 33/08*   (2006.01)
*G09G 3/34*    (2006.01)

(52) U.S. Cl.
CPC ..... *G02F 1/133603* (2013.01); *G09G 3/3426* (2013.01); *H05B 33/0845* (2013.01);
(Continued)

(58) Field of Classification Search
CPC .......... G02F 1/133603; H05B 33/0845; G09G 2320/064
See application file for complete search history.

(56) References Cited

U.S. PATENT DOCUMENTS

2010/0214209 A1* 8/2010 Seo ........................ G09G 3/342
345/102
2012/0001946 A1  1/2012 Cho et al.
(Continued)

FOREIGN PATENT DOCUMENTS

CN       102194411 A    9/2011
CN       102314841 A    1/2012
(Continued)

OTHER PUBLICATIONS

International Search Report dated May 31, 2017 issued in corresponding International Application No. PCT/CN2017/075956 along with an English translation of the ISR and Written Opinion.

*Primary Examiner* — Sahlu Okebato
(74) *Attorney, Agent, or Firm* — Nath, Goldberg & Meyer; Joshua B. Goldberg

(57) ABSTRACT

The present invention discloses a backlight adjustment method and system, a backlight module and a display device. The backlight adjustment method includes: calculating a first outgoing light brightness of an backlight block corresponding to each image block; dividing a backlight source into a number of closed areas according to the first outgoing light brightnesses of the backlight blocks; calculating the number of backlight blocks included in each of the light-emitting closed areas; looking up a corresponding drive current in a preset correspondence table, wherein predetermined correspondence between the number of backlight blocks and the drive current applied to light up the corresponding number of backlight blocks and make an actual brightness of the corresponding area equal to a preset (Continued)

brightness is recorded in the correspondence table; and outputting the drive current obtained by the lookup operation to the backlight blocks in the light-emitting closed area.

13 Claims, 4 Drawing Sheets

(52) U.S. Cl.
CPC .............. *G09G 2320/0285* (2013.01); *G09G 2320/064* (2013.01); *G09G 2320/0626* (2013.01); *G09G 2360/16* (2013.01)

(56) References Cited

U.S. PATENT DOCUMENTS

| | | |
|---|---|---|
| 2015/0365621 A1 | 12/2015 | Zhang et al. |
| 2016/0019863 A1* | 1/2016 | Chuang .................... G06K 9/46 345/212 |
| 2016/0322006 A1 | 11/2016 | Chen |
| 2016/0335957 A1 | 11/2016 | Fu et al. |

FOREIGN PATENT DOCUMENTS

| | | |
|---|---|---|
| CN | 103165081 A | 6/2013 |
| CN | 103514839 A | 1/2014 |
| CN | 104505055 A | 4/2015 |
| CN | 104766569 A | 7/2015 |
| CN | 105469746 A | 4/2016 |
| CN | 105788539 A | 7/2016 |
| KR | 10-2011-0064094 A | 6/2011 |
| KR | 10-2012-0036527 A | 4/2012 |

* cited by examiner

BACKLIGHT ADJUSTMENT METHOD AND SYSTEM, BACKLIGHT MODULE AND DISPLAY DEVICE

This is a National Phase Application filed under 35 U.S.C. 371 as a national stage of PCT/CN2017/075956, filed Mar. 8, 2017, an application claiming the benefit of Chinese Patent Application No. 201610342245.1, filed on May 20, 2016, the entire content of each of which is hereby incorporated by reference in its entirety.

TECHNICAL FIELD

The present invention relates to the field of display technology, and in particular relates to a backlight adjustment method and system, a backlight module and a display device.

BACKGROUND

To reduce overall power consumption of a liquid crystal display and increase its contrast, backlight adjustment technology has been applied in the field of liquid crystal display.

At present, backlight adjustment of a liquid crystal display is achieved by local dimming. Specifically, first, all LED lamps are evenly divided into a number of backlight blocks (LED blocks), and a picture to be displayed is divided into a number of image blocks correspondingly, the backlight blocks and the image blocks being in one-to-one correspondence; then outgoing light brightnesses of the backlight blocks are calculated based on display brightnesses of pixels in the image blocks by using a preset dynamic dimming algorithm; next, corresponding drive currents, namely drive currents corresponding to the backlight blocks, are looked up based on the calculated backlight brightnesses; and finally, the corresponding drive currents are outputted to the backlight blocks, so that the backlight blocks output corresponding outgoing light brightnesses.

With the existing local dimming method, a backlight block corresponding to a highlight portion of the picture to be displayed can exhibit relatively high outgoing light brightness, while a backlight block corresponding to a dark portion of the picture to be displayed can exhibit relatively low outgoing light brightness or even be turned off. In this case, the power consumption of a backlight source can be effectively reduced since the outgoing light brightnesses of part of the backlight blocks are lowered.

Although the existing backlight adjustment technology can reduce the power consumption of the backlight source, obvious bright-dark layering is prone to occur in an area on the backlight source corresponding to an intersection between the backlight block with a high outgoing brightness and the backlight block with a low outgoing brightness, which can affect a user's experience.

SUMMARY

The present invention provides a backlight adjustment method and system, a backlight module and a display device, and is intended to at least solve one of the technical problems in the prior art.

To achieve the above object, the present invention provides a backlight adjustment method, including steps of:

calculating, based on display brightnesses of pixels in image blocks of an image to be displayed, a first outgoing light brightness of an backlight block corresponding to each of the image blocks;

dividing a backlight source into a number of closed areas according to the first outgoing light brightnesses of the backlight blocks, wherein the first outgoing light brightnesses of the backlight blocks located in a same closed area are same, the first outgoing light brightnesses of the backlight blocks located in different closed areas are different, and a closed area including therein the backlight block whose first outgoing light brightness is not 0 is a light-emitting closed area;

calculating the number of backlight blocks included in each light-emitting closed area;

looking up, based on the number of backlight blocks included in the light-emitting closed area, a corresponding drive current in a preset correspondence table, wherein predetermined correspondence between the number of backlight blocks and the drive current applied to light up the corresponding number of backlight blocks in successive arrangement at the same time and make an actual brightness of the corresponding area equal to a preset brightness is recorded in the correspondence table; and outputting the drive current obtained by the lookup operation to the backlight blocks in the light-emitting closed area.

Optionally, before the step of calculating a first outgoing light brightness of each backlight block based on display brightnesses of pixels corresponding to the backlight block, the method further includes steps of:

acquiring an input signal of an image to be displayed; and processing the input signal to obtain a brightness of each of pixels on the image to be displayed.

Optionally, the first outgoing light brightness of the backlight block is equal to a mean value of brightnesses of all pixels corresponding to the backlight block.

Optionally, the first outgoing light brightness of the backlight block is equal to a maximum value of brightnesses of all pixels corresponding to the backlight block.

To achieve the above object, the present invention further provides a backlight adjustment system, including:

a brightness calculation module configured to calculate, based on display brightnesses of pixels in image blocks of an image to be displayed, a first outgoing light brightness of an backlight block corresponding to each of the image blocks;

an area division module configured to divide a backlight source into a number of closed areas according to the first outgoing light brightnesses of the backlight blocks, wherein the first outgoing light brightnesses of the backlight blocks located in a same closed area are same, the first outgoing light brightnesses of the backlight blocks located in different closed areas are different, and a closed area including therein the backlight block whose first outgoing light brightness is not 0 is a light-emitting closed area;

a counting module configured to count the number of backlight blocks included in each of the light-emitting closed areas;

a lookup module configured to look up, based on the number of backlight blocks included in each of the light-emitting closed areas, a corresponding drive current in a preset correspondence table, wherein predetermined correspondence between the number of backlight blocks and the drive current applied to light up the corresponding number of backlight blocks in successive arrangement at the same time and make an actual brightness of the corresponding area equal to a preset brightness is recorded in the correspondence table; and a driver module configured to output the corresponding drive current obtained through the lookup operation by the lookup module to the backlight blocks in the light-emitting closed area.

Optionally, the backlight adjustment system further includes:

a signal acquisition module configured to acquire an input signal of an image to be displayed; and a brightness acquisition module configured to process the input signal to obtain brightness of each of pixels on the image to be displayed.

Optionally, the first outgoing light brightness of the backlight block is equal to a mean value of brightnesses of all pixels corresponding to the backlight block.

Optionally, the first outgoing light brightness of the backlight block is equal to a maximum value of brightnesses of all pixels corresponding to the backlight block.

To achieve the above object, the present invention further provides a backlight module including a backlight adjustment system, wherein the backlight adjustment system is the above backlight adjustment system.

To achieve the above object, the present invention further provides a display device including a backlight module, wherein the backlight module is the above backlight module.

The present invention provides a backlight adjustment method and system, a backlight module and a display device. The backlight adjustment method includes: calculating, based on display brightnesses of pixels in image blocks of an image to be displayed, a first outgoing light brightness of an backlight block corresponding to each of the image blocks; dividing a backlight source into a number of closed areas according to the first outgoing light brightnesses of the backlight blocks, wherein the first outgoing light brightnesses of the backlight blocks located in a same closed area are same, the first outgoing light brightnesses of the backlight blocks located in different closed areas are different, and a closed area including therein the backlight block whose first outgoing light brightness is not 0 is a light-emitting closed area; calculating the number of backlight blocks included in each of the light-emitting closed areas; looking up, based on the number of backlight blocks included in the light-emitting closed area, a corresponding drive current in a preset correspondence table, wherein predetermined correspondence between the number of backlight blocks and the drive current applied to light up the corresponding number of backlight blocks in successive arrangement at the same time and make an actual brightness of the corresponding area equal to a preset brightness is recorded in the correspondence table; and outputting the drive current obtained by the lookup operation to the backlight blocks in the light-emitting closed area. With the technical solution of the present invention, the uniformity of the actual brightnesses of the light-emitting areas on the backlight source can be ensured effectively while the overall power consumption of the backlight source is effectively reduced, and thus a user's experience is effectively improved.

DETAILED DESCRIPTION OF THE EMBODIMENTS

To make those skilled in the art better understand the technical solutions of the present invention, a backlight adjustment method and system, a backlight module and a display device provided by the present invention are described in detail below in conjunction with the accompanying drawings.

Figures 1, 2:
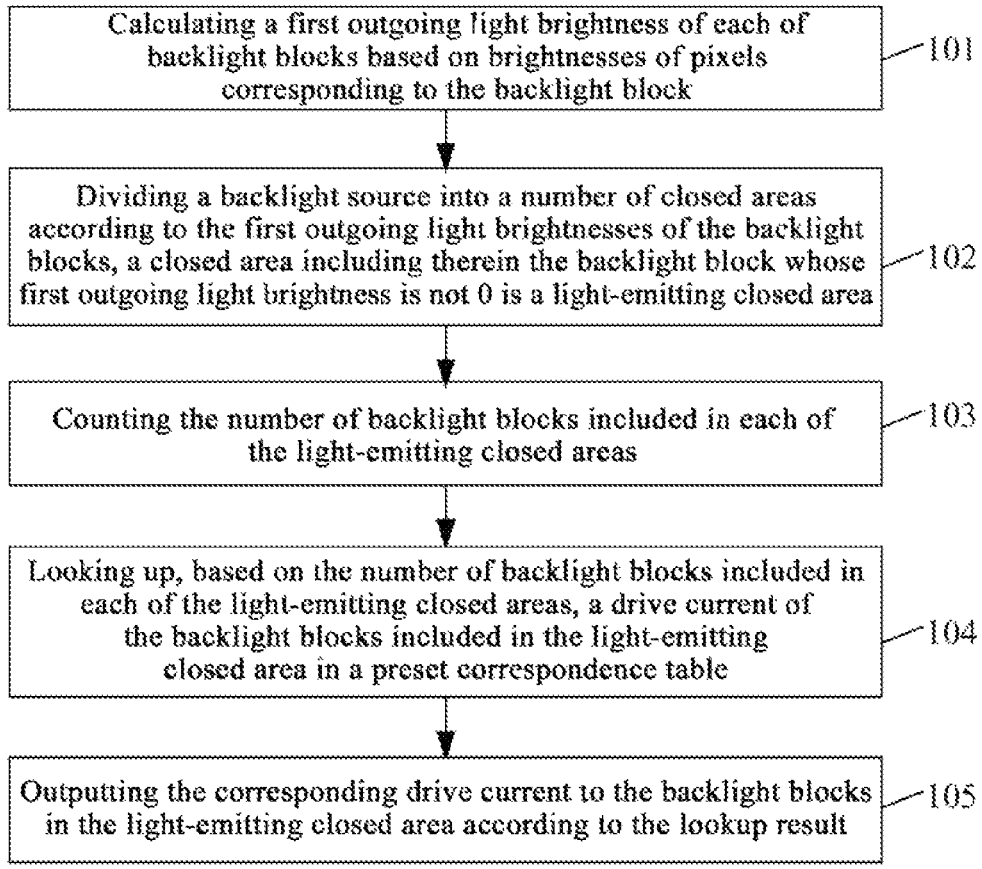
FIG. 1 is a flow diagram of a backlight adjustment method provided by a first embodiment of the present invention.
FIG. 2 is a schematic diagram of first outgoing light brightnesses of backlight blocks after step 101.

FIG. 1 is a flow diagram of a backlight adjustment method provided by a first embodiment of the present invention. As shown in FIG. 1, the backlight adjustment method is used for adjusting outgoing light brightnesses of at least part of backlight blocks on a backlight source, to ensure uniformity of actual brightnesses of light emitting areas on the backlight source while reducing the power consumption of the backlight source. The backlight adjustment method includes the following steps.

Step 101 includes: calculating a first outgoing light brightness of each backlight block based on display brightnesses of pixels corresponding to the backlight block.

In step 101, the first outgoing light brightness of each of the backlight blocks is calculated based on the brightnesses of the pixels corresponding to the backlight block by using a preset dynamic dimming algorithm.

It needs to be noted that the outgoing light brightness in the present invention refers to the brightness of light emitted by the backlight block, and the actual brightness in the present invention refers to the brightness of light corresponding to an area.

The actual brightness of an area corresponding to a backlight block refers to illumination brightness of the area corresponding to the backlight block. This actual brightness is influenced not only by the outgoing light brightness of the backlight block corresponding thereto, but also by the outgoing light brightness(es) of other backlight block(s) in the vicinity of the backlight block corresponding thereto. For example, when two adjacent backlight blocks both having an outgoing light brightness of 100 nit emit light at the same time, the actual brightness of the area corresponding to any one of the two backlight blocks is greater than 100 nit. In contrast, if a single backlight block in another area emits light alone, with its outgoing light brightness still being 100 nit, the actual brightness provided by the single backlight block is smaller than that provided by any one of the above two adjacent backlight blocks. For a user, the two areas on the displayed picture should have a same brightness, but, due to different numbers of backlight blocks that emit light, the user experiences different actual brightnesses.

The "actual brightness" described herein is an illumination brightness that can be measured by using a brightness measuring apparatus. For example, a CA310 device can be used to measure actual brightnesses under different conditions.

In this embodiment, optionally, the preset dynamic dimming algorithm may be a "mean algorithm". Specifically, a mean value of the brightnesses of all pixels corresponding to the backlight block is calculated, and the mean value is used as the first outgoing light brightness corresponding to the backlight block.

Optionally, the preset dynamic dimming algorithm may be a "max's algorithm". Specifically, a maximum value of the brightnesses of all pixels corresponding to the backlight block is obtained, and the maximum value is used as the first outgoing light brightness corresponding to the outgoing light brightness of the backlight block.

It needs to be noted that calculating the first outgoing light brightness of each backlight block by using the "mean algorithm" or "max's algorithm" described above is a preferred solution in this embodiment, and is not intended to limit the technical solutions of the present invention. In this embodiment, a small amount of calculation is involved in calculating the first outgoing light brightness by using the "mean algorithm" or "max's algorithm", which allows quick output of results, thereby ensuring real-time property of the backlight adjustment process. Those skilled in the art should understand that all technical means for calculating the first outgoing light brightness of the backlight block based on the brightnesses of pixels corresponding to the backlight block should be encompassed within the protection scope of the present invention, and will not be specifically described here by way of examples.

To make those skilled in the art understand the technical solutions of the present invention, exemplary description is given below in conjunction with a specific example. It is assumed that the backlight source includes 7×4 backlight blocks. FIG. 2 is a schematic diagram of the first outgoing light brightnesses of the backlight blocks after step 101. As shown in FIG. 2, it is assumed that the calculated first outgoing light brightnesses of ten backlight blocks are 0, and the calculated first outgoing light brightnesses of eighteen backlight blocks are not 0.

Step 102 includes: dividing the backlight source into a number of closed areas according to the first outgoing light brightnesses of the backlight blocks, wherein the first outgoing light brightnesses of the backlight blocks located in a same closed area are same, the first outgoing light brightnesses of the backlight blocks located in different closed areas are different, and any closed area including therein the backlight block whose first outgoing light brightness is not 0 is a light-emitting closed area.

Figure 3:
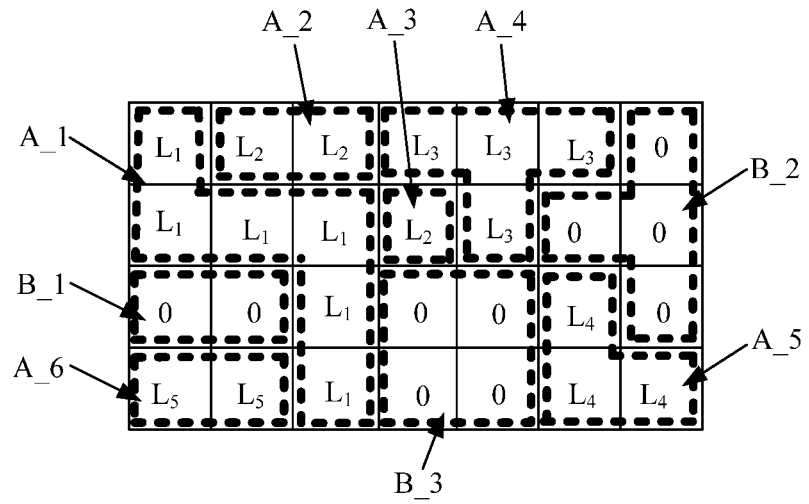
FIG. 3 is a schematic diagram of dividing a backlight source into closed areas after step 102.

FIG. 3 is a schematic diagram of dividing the backlight source into closed areas after step 102. As shown in FIG. 3, in step 102, the backlight source is divided into a number of closed areas according to the first outgoing light brightnesses of the backlight blocks calculated in step 101, wherein the first outgoing light brightnesses of the backlight blocks located in a same closed area are same, and the first outgoing light brightnesses of the backlight blocks located in different closed areas are different.

As can be seen from FIG. 3, the entire backlight source may be divided into nine closed areas, namely, six light-emitting closed areas A_1 to A_6 (each including therein backlight blocks whose first outgoing light brightnesses are not 0) and three non-light-emitting closed areas B_1 to B_3 (each including therein backlight blocks whose first outgoing light brightnesses are 0).

It needs to be noted that after steps 101 and 102, in the light-emitting closed areas A_1 to A_6, the light emitting brightnesses of the light-emitting closed areas are not all the same.

Step 103 includes: counting the number of backlight blocks included in each of the light-emitting closed areas.

In step 103, the number of backlight blocks included in each of the light-emitting closed areas A_1 to A_6 obtained in step 102 is counted.

The number of the backlight blocks (whose first outgoing light brightnesses are all $L_1$) included in the light-emitting closed area A_1 is six, the number of the backlight blocks (whose first outgoing light brightnesses are all $L_2$) included in the light-emitting closed area A_2 is two, the number of the backlight block (whose first outgoing light brightness is $L_2$) included in the light-emitting closed area A_3 is one, the number of the backlight blocks (whose first outgoing light brightnesses are all $L_3$) included in the light-emitting closed area A_4 is four, the number of the backlight blocks (whose first outgoing light brightnesses are all $L_4$) included in the light-emitting closed area A_5 is three, and the number of the backlight blocks (whose first outgoing light brightnesses are all $L_5$) included in the light-emitting closed area A_6 is two.

Step 104 includes looking up a drive current of the backlight block(s) included in each of the light-emitting closed areas in a preset correspondence table based on the number of the backlight block(s) included in the light-emitting closed area.

In step 104, the drive current of the backlight block(s) in each of the light-emitting closed areas A_1 to A_6 is obtained based on the number of the backlight block(s) included in each of the light-emitting closed areas A_1 to A_6 by lookup operation. Correspondence between the number of backlight block(s) and the drive current applied to light up the corresponding number of backlight block(s) in successive arrangement at the same time and to make an actual brightness of the corresponding area equal to a preset brightness is recorded in the correspondence table. Optionally, the preset brightness may be a maximum brightness of the backlight source, and of course, the preset brightness may also be adjusted correspondingly as actually practically required.

The correspondence table may be obtained by experiments in advance. Specifically, in an example of obtaining the drive current corresponding to three backlight blocks in successive arrangement, the three backlight blocks in successive arrangement on the backlight source are lit up at the same time with a same drive current (other backlight blocks on the backlight source are not lit up), then the drive current is adjusted until the actual brightness of the area corresponding to the three backlight blocks in successive arrangement reaches the preset brightness, and the corresponding drive current is recorded and written into the correspondence table. Table 1 is a correspondence table between the number of backlight block(s) and the drive current, as shown in Table 1 below:

TABLE 1

Correspondence table between the number of backlight block(s) and the drive current

| The number of backlight block(s) | 1 | 2 | 3 | 4 | ... | n |
|---|---|---|---|---|---|---|
| The drive current | $I_1$ | $I_2$ | $I_3$ | $I_4$ | | $I_n$ |

Step 105 includes: outputting the corresponding drive current to the backlight block(s) in each of the light-emitting closed areas according to lookup results.

Figure 4:
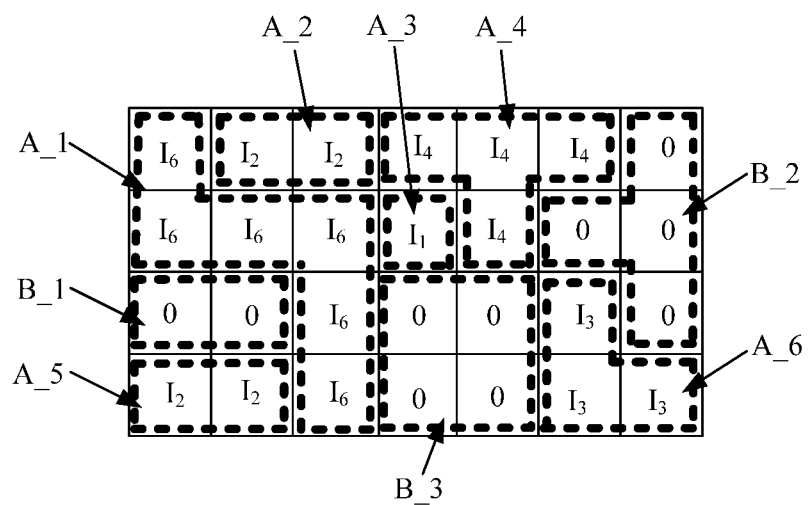
FIG. 4 is a schematic diagram of drive currents corresponding to the backlight blocks after step 105.

FIG. 4 is a schematic diagram of the drive currents corresponding to the backlight blocks after step 105. As shown in FIG. 4, the drive currents of the backlight blocks in the non-light-emitting closed areas B_1 to B_3 are 0, and the backlight blocks in the non-light-emitting closed areas do not emit light, and thus the power consumption of the entire backlight source can be effectively reduced.

In addition, the drive current of each of the backlight blocks in the light-emitting closed area A_1 is $I_6$, the drive current of each of the backlight blocks in the light-emitting closed area A_2 is $I_2$, the drive current of each backlight block in the light-emitting closed area A_3 is $I_1$, the drive current of each of the backlight blocks in the light-emitting closed area A_4 is $I_4$, the drive current of each of the backlight blocks in the light-emitting closed area A_5 is $I_3$, and the drive current of each of the backlight blocks in the light-emitting closed area A_6 is $I_2$. The drive current of each of the backlight blocks in the non-light-emitting closed areas B_1 to B_3 is 0. At this time, the backlight blocks in each of the light-emitting closed areas A_1 to A_6 are driven by the corresponding drive current to emit light with second outgoing light brightness, and the actual brightness of each of the light-emitting closed areas A_1 to A_6 is the preset brightness, and thus uniformity of the actual brightnesses of the light-emitting areas on the backlight source is ensured.

As can be seen from the above description, with the technical solution of the present invention, the uniformity of the actual brightnesses of the light-emitting areas on the backlight source is ensured effectively while the overall power consumption of the backlight source is effectively reduced, and thus the user's experience can be effectively improved. In addition, when the preset brightness is equal to the maximum brightness of the backlight source in the present invention, the contrast of the display device can also be effectively improved with the technical solution of the present invention.

Second Embodiment

Figure 5:
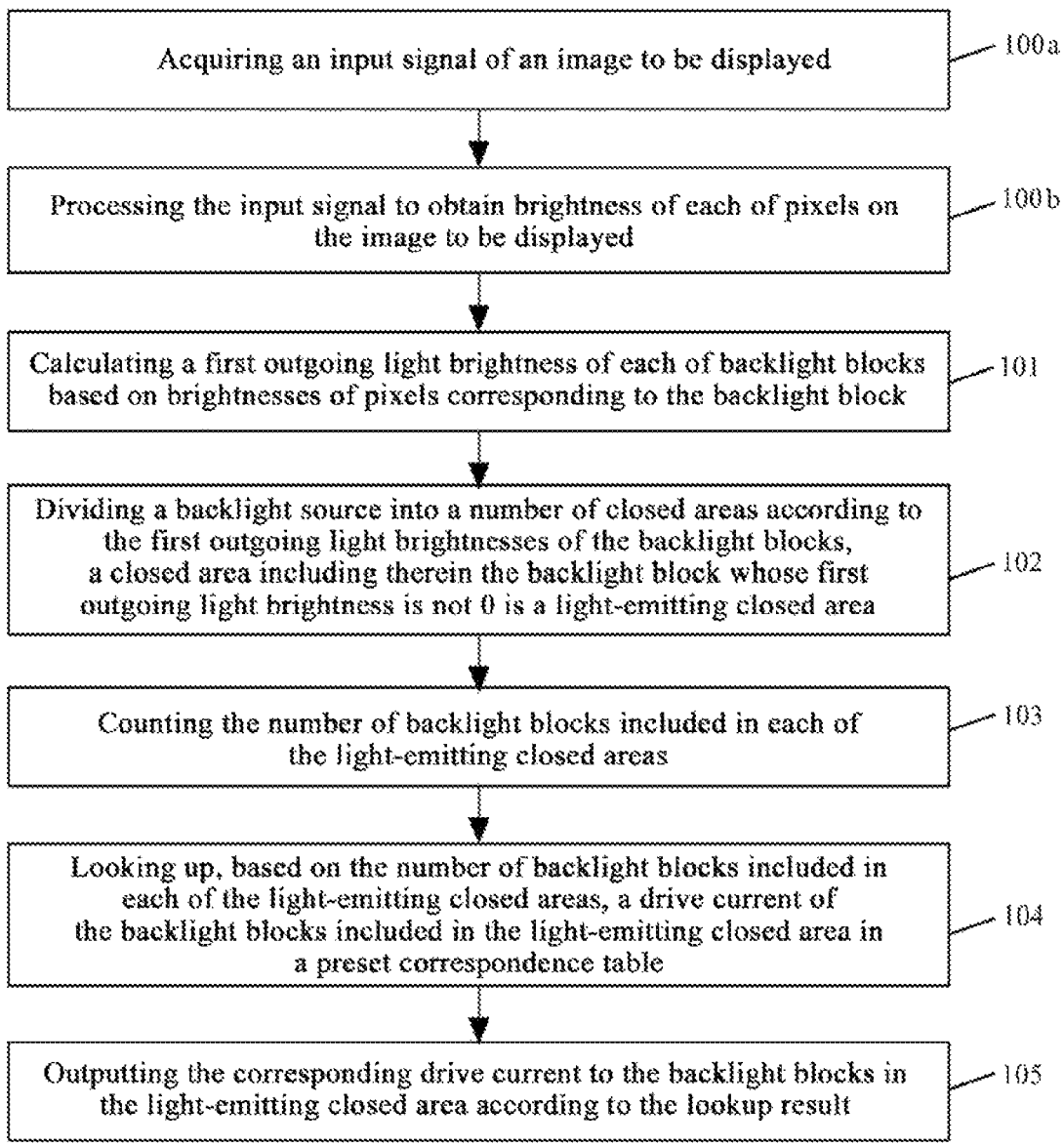
FIG. 5 is a flow chart of a backlight adjustment method provided by a second embodiment of the present invention.

FIG. 5 is a flow chart of a backlight adjustment method provided by the second embodiment of the present invention. As shown in FIG. 5, the backlight adjustment method further includes steps 100a and 100b in addition to steps 101 to 105 in the first embodiment described above. Steps 100a and 100b in this embodiment are described below only, while the contents of steps 101 to 105 may refer to the description in the above first embodiment.

Step 100a includes: acquiring an input signal of an image to be displayed.

Step 100b includes: processing the input signal to obtain brightness of each of pixels on the image to be displayed.

In steps 100a and 100b, the input signal of the image to be displayed is acquired from the display device, and brightnesses of sub-pixels of each of the pixels can be acquired based on the input signal, and then weighted summation is performed on the brightnesses of the sub-pixels to obtain the brightness of the corresponding pixel. The brightness of each of the pixels on the image to be displayed calculated in step 100b can be used in the subsequent step 101 to calculate the first outgoing light brightness of each of the backlight blocks.

Third Embodiment

Figure 6:
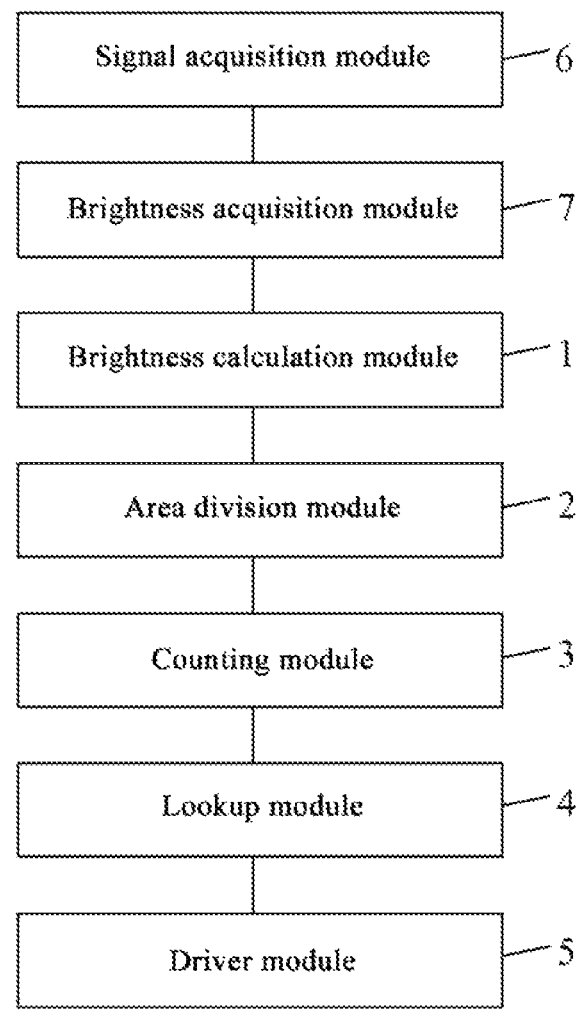
FIG. 6 is a structural schematic diagram of a backlight adjustment system provided by a third embodiment of the present invention.

FIG. 6 is a structural schematic diagram of a backlight adjustment system provided by the third embodiment of the present invention. As shown in FIG. 6, the backlight adjustment system includes: a brightness calculation module 1, an area division module 2, a counting module 3, a lookup module 4 and a driver module 5.

The brightness calculation module 1 is configured to calculate a first outgoing light brightness of each of backlight blocks based on brightnesses of pixels corresponding to the backlight block. As an optional solution in this embodiment, the first outgoing light brightness of each backlight block is equal to a mean value of brightnesses of all pixels corresponding to the backlight block. As another optional solution in this embodiment, the first outgoing light brightness of each backlight block is equal to a maximum value of the brightnesses of all pixels corresponding to the backlight block.

The area division module 2 is configured to divide a backlight source into a number of closed areas according to the first outgoing light brightnesses of the backlight blocks, wherein the first outgoing light brightnesses of the backlight blocks located in a same closed area are same, and the first outgoing light brightnesses of the backlight blocks located in any adjacent two closed areas are different, and a closed area in which the first outgoing light brightness(es) of the backlight block(s) included is/are not 0 is a light-emitting closed area.

The counting module 3 is configured to count the number of backlight blocks included in each of the light-emitting closed areas.

The lookup module 4 is configured to look up, based on the number of backlight block(s) included in each of the light-emitting closed areas, a drive current of the backlight block(s) included in the light-emitting closed area in a preset correspondence table. Correspondence between each of the numbers of backlight block(s) and the drive current applied when the corresponding number of backlight blocks in successive arrangement are lit up at the same time and an actual brightness of the corresponding area is equal to a preset brightness is recorded in the correspondence table.

The driver module 5 is configured to output the corresponding drive current to the backlight block(s) in each of the light-emitting closed areas according to the lookup results from the lookup module 4.

It needs to be noted that the brightness calculation module 1 in this embodiment is configured to execute step 101 in the first embodiment, the area division module 2 is configured to execute step 102 in the first embodiment, the counting module 3 is configured to execute step 103 in the first embodiment, the lookup module 4 is configured to execute step 104 in the first embodiment, and the driver module 5 is configured to execute step 105 in the first embodiment. Specific working processes of the modules in this embodiment may refer to the description in the first embodiment, and are not repeated here.

With the backlight adjustment system provided in this embodiment, the uniformity of the actual brightnesses of the light-emitting areas on the backlight source can be ensured while the overall power consumption of the backlight source is effectively reduced, and thus the user's experience can be effectively improved.

Optionally, the backlight adjustment system further includes a signal acquisition module 6 and a brightness acquisition module 7. The signal acquisition module 6 is configured to acquire an input signal of an image to be displayed; and the brightness acquisition module 7 is configure to process the input signal to obtain the brightness of each of the pixels on the image to be displayed.

It needs to be noted that the signal acquisition module 6 in this embodiment is configured to execute step 100a in the second embodiment, and the brightness acquisition module 7 is configured to execute step 100b in the second embodiment. Specific working processes of the signal acquisition module 6 and the brightness acquisition module 7 in this embodiment may refer to the description in the second embodiment, and are not repeated here.

Fourth Embodiment

The fourth embodiment of the present invention provides a backlight module, including a backlight source and a backlight adjustment system, wherein the backlight adjustment system is the one in the third embodiment and specific content thereof may refer to the description in the third embodiment.

Fifth Embodiment

The fifth embodiment of the present invention provides a display device, including a backlight module, wherein the backlight module is the one in the fourth embodiment and specific content thereof may refer to the description in the fourth embodiment.

It should be understood that the above embodiments are only exemplary embodiments for illustrating the principle of the present invention; however, the present invention is not limited thereto. For those of ordinary skill in the art, various modifications and improvements can be made without departing from the spirit and essence of the present invention, and these modifications and improvements are also encompassed within the protection scope of the present invention.

The invention claimed is:

1. A backlight adjustment method, comprising:
   calculating, based on display brightness of pixels in image blocks of an image to be displayed, a first outgoing light brightness of a backlight block corresponding to each of the image blocks;
   dividing a backlight source into a number of closed areas according to the first outgoing light brightness of the backlight blocks, wherein the first outgoing light brightness of the backlight blocks located in a same closed area are same, the first outgoing light brightness of the backlight blocks located in different closed areas are different, and a closed area including therein the backlight block whose the first outgoing light brightness is not 0 is a light-emitting closed area;
   calculating the number of backlight blocks included in each of the light-emitting closed areas;
   looking up, based on the number of backlight blocks included in the light-emitting closed area, a corresponding drive current in a preset correspondence table, wherein predetermined correspondence between the number of backlight blocks and the drive current applied to light up the corresponding number of backlight blocks in successive arrangement at the same time and make an actual brightness of the corresponding area equal to a preset brightness is recorded in the correspondence table; and
   outputting the drive current obtained by the lookup operation to the backlight blocks in the light-emitting closed area.

2. The backlight adjustment method of claim 1, wherein before the step of calculating a first outgoing light brightness of each of the backlight blocks based on brightness of pixels corresponding to the backlight block, the method further comprises:
   acquiring an input signal of the image to be displayed; and
   processing the input signal to obtain brightness of each of pixels on the image to be displayed.

3. The backlight adjustment method of claim 1, wherein the first outgoing light brightness of the backlight block is equal to a mean value of brightness of all pixels corresponding to the backlight block.

4. The backlight adjustment method of claim 1, wherein the first outgoing light brightness of the backlight block is equal to a maximum value of brightness of all pixels corresponding to the backlight block.

5. A backlight adjustment system, comprising:
   a brightness calculation module configured to calculate, based on display brightness of pixels in image blocks of an image to be displayed, a first outgoing light brightness of an backlight block corresponding to each of the image blocks;
   an area division module configured to divide a backlight source into a number of closed areas according to the first outgoing light brightness of the backlight blocks, wherein the first outgoing light brightness of the backlight blocks located in a same closed area are same, the first outgoing light brightness of the backlight blocks located in different closed areas are different, and a closed area including therein the backlight block whose first outgoing light brightness is not 0 is a light-emitting closed area;
   a counting module configured to count the number of backlight blocks included in each of the light-emitting closed areas;
   a lookup module configured to look up, based on the number of backlight blocks included in each of the light-emitting closed areas, a corresponding drive current in a preset correspondence table, wherein predetermined correspondence between the number of backlight blocks and the drive current applied to light up the corresponding number of backlight blocks in successive arrangement at the same time and make an actual brightness of the corresponding area equal to a preset brightness is recorded in the correspondence table; and
   a driver module configured to output the corresponding drive current obtained through the lookup operation by the lookup module to the backlight blocks in the light-emitting closed area.

6. The backlight adjustment system claim 5, further comprising:
   a signal acquisition module configured to acquire an input signal of the image to be displayed; and
   a brightness acquisition module configured to process the input signal to obtain brightness of each of pixels on the image to be displayed.

7. The backlight adjustment system of claim 5, wherein the first outgoing light brightness of the backlight block is equal to a mean value of brightness of all pixels corresponding to the backlight block.

8. The backlight adjustment system of claim 5, wherein the first outgoing light brightness of each backlight block is equal to a maximum value of brightness of all pixels corresponding to the backlight block.

9. A backlight module, comprising the backlight adjustment system of claim 5.

10. A backlight module, comprising the backlight adjustment system of claim 6.

11. A backlight module, comprising the backlight adjustment system of claim 7.

12. A backlight module, comprising the backlight adjustment system of claim 8.

13. A display device, comprising the backlight module of claim 9.

* * * * *